Figure 1:
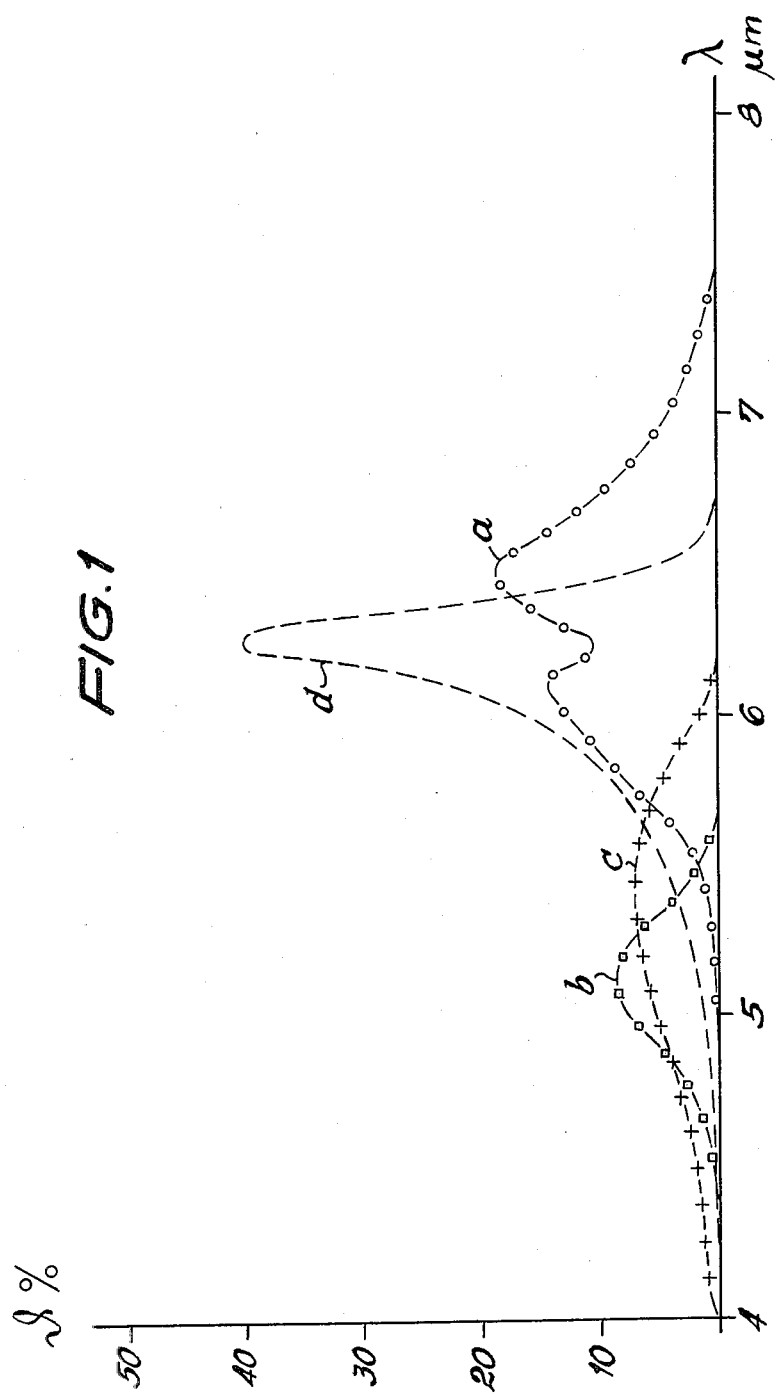

United States Patent [19]
Neuroth

[11] 3,887,485
[45] June 3, 1975

[54] SOLID OPTICAL FILTER HAVING SELECTIVE WAVELENGTH PERMEABILITY

[75] Inventor: Norbert Neuroth, Maniz-Mombach, Germany

[73] Assignee: Jenaer Glaswerk Schott & Gen., Germany

[22] Filed: Sept. 1, 1972

[21] Appl. No.: 285,899

Related U.S. Application Data

[63] Continuation-in-part of Ser. No. 79,739, Oct. 12, 1970, abandoned.

[30] Foreign Application Priority Data

Oct. 31, 1969 Germany............................ 1954802

[52] U.S. Cl. ................. 252/300; 350/311; 350/312
[51] Int. Cl. ........ G02b 5/20; F21v 9/02; F21v 9/06
[58] Field of Search ............. 252/300; 350/311, 312

[56] References Cited
UNITED STATES PATENTS

| | | | |
|---|---|---|---|
| 2,386,527 | 5/1961 | Redfield et al. | 252/300 |
| 3,451,829 | 6/1969 | Bromer et al. | 252/300 |
| 3,476,690 | 11/1969 | Carnall, Jr. | 252/300 |
| 3,592,528 | 7/1971 | Kiss | 252/300 |

OTHER PUBLICATIONS

McAlister, Smithsonial Miscellaneous Collection, Vol. 93, No. 7, 3/35, pp. 1–12.

Redfield et al., Journal of the Optical Society of America, Vol. 51, No. 2, 2/61, pp. 184–185.

Barnes et al., Physical Review, Vol. 49, 5/36, pp. 732–740.

*Primary Examiner*—Norman G. Torchin
*Assistant Examiner*—J. P. Brammer
*Attorney, Agent, or Firm*—Hill, Gross, Simpson, Van Santen, Steadman, Chiara & Simpson

[57] ABSTRACT

The invention relates to a stray light filter comprising a solid light ray permeable material having a powder dispersed therein. The refractive index of the powder in the short-wave spectral range changes more greatly than that of the solid material in which the powder is embedded, so that in a specific wave length range the refractive indices of the solid material and the powder are equal. The embedding material is solid at the operational range of the filter and may, for instance, consist of at least one alkali halide and/or alkaline earth halide. The powder to be dispersed in the solid embedding material is selected from the group consisting, for instance, of oxide glass, an inorganic oxide and salts of oxygen-containing inorganic acids or mixtures of these materials.

4 Claims, 3 Drawing Figures

SOLID OPTICAL FILTER HAVING SELECTIVE WAVELENGTH PERMEABILITY

The invention relates to improvements in stray light filters and constitutes a continuation-in-part of application Ser. No. 79,739 filed Oct. 12, 1970, now abandoned.

Optical filters are known which consist of a fluid containing a fine-grained dispersed powder in which the powder in the short-wave spectral range has a higher refractive index than the liquid whose refractive index, whereby however, the refractive index of the powder decreases more greatly with increasing wave length than that of the liquid. There is, however, a range in which the liquid and the powder have equal refractive index. In this particular range the mixture is to be considered as optically uniform, i.e., in this spectral range the substance is light transmitting, while light having smaller and a larger wave length is dispersed. Such a stray light filter was first described by Christiansen (Ann. Phys. 23, 1884, page 298; 24, 1885, page 439).

The present invention also relates to a stray light filter, however, not to one consisting of a powder and a liquid, but to one in which the powder is embedded in a solid substance. This will have two substantial technical advantages. One has a compact article in place of a liquid cuvette and, furthermore, the light permeability of the filter of the present invention is practically independent of the temperature, while a liquid-powder filter is very substantially dependent of the temperature. A third advantage is that the stray light filter of the invention may withstand temperatures up to 400° and 600°C, depending upon the nature of the embedding material.

The substances which may be employed as embedding material should comply with the following requirements:

a. They must be capable of being compressed or cast into an optical homogenous material, preferably by application of higher temperatures.

b. The refractive index in a short-wave spectral range should be smaller than the one of the powder to be embedded in the material, and the change in the refractive index with the wave length should be less than the change of the refractive index of the powder to be embedded, so that the dispersion characteristics of the embedding material and the embedded powder intersect at a predetermined wave length at which the filter is permeable.

Embedding materials suitable for the purposes of the present invention are, for instance, the alkalihalogenides and alkaline earth halogenides, particularly fluorides, all of which may be compressed relatively well. These materials are also stable at atmospheric pressure, or may be made stable by providing them with a coating, respectively. They have a high strength and can be easily worked optically.

The powder to be embedded consists preferably of oxide glasses, oxides or salts of inorganic oxygen-containing acids or mixtures of the same. The following examples are given to illustrate the methods of producing the filters.

Figure 2:
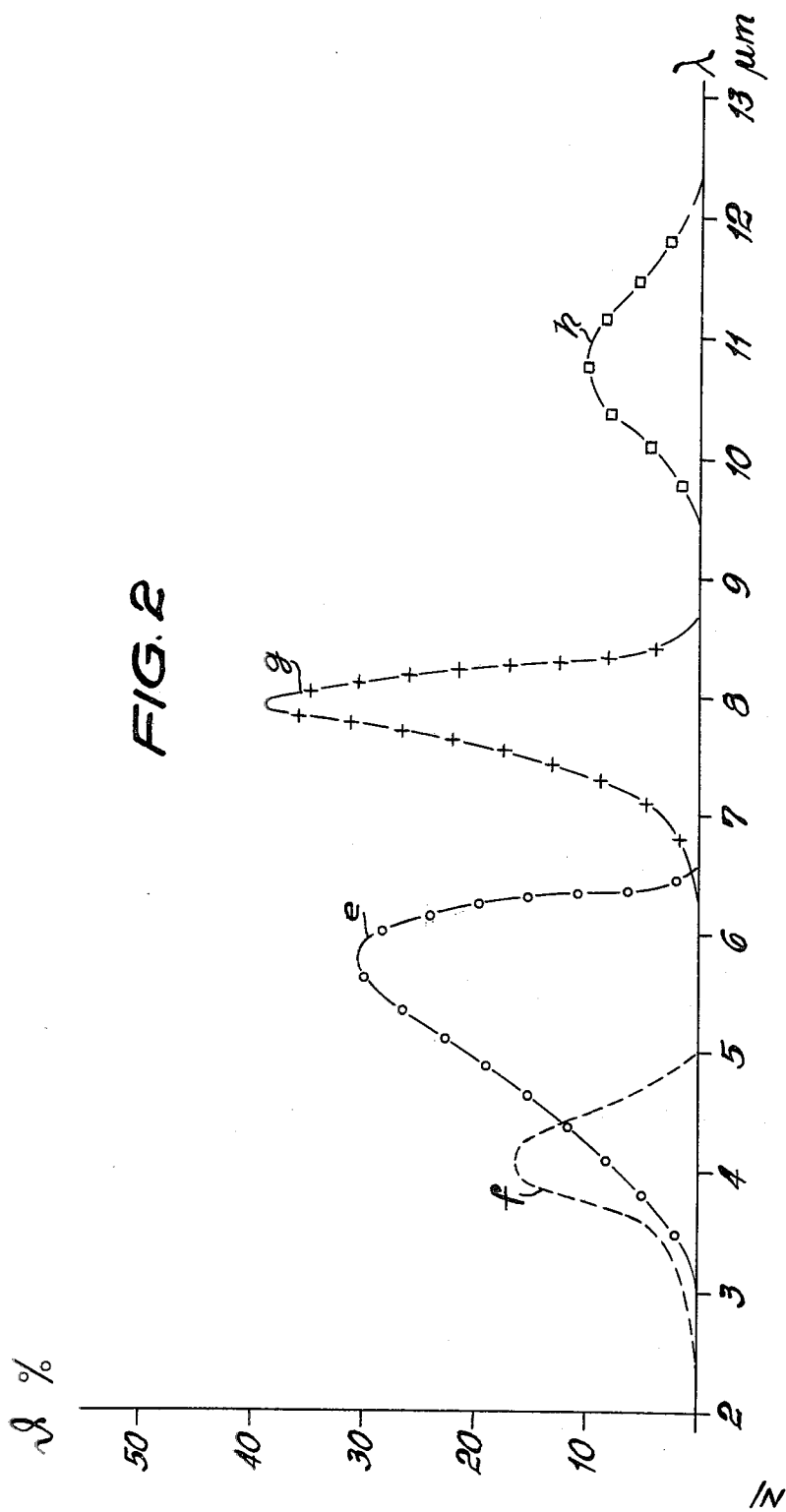
Figure 3:
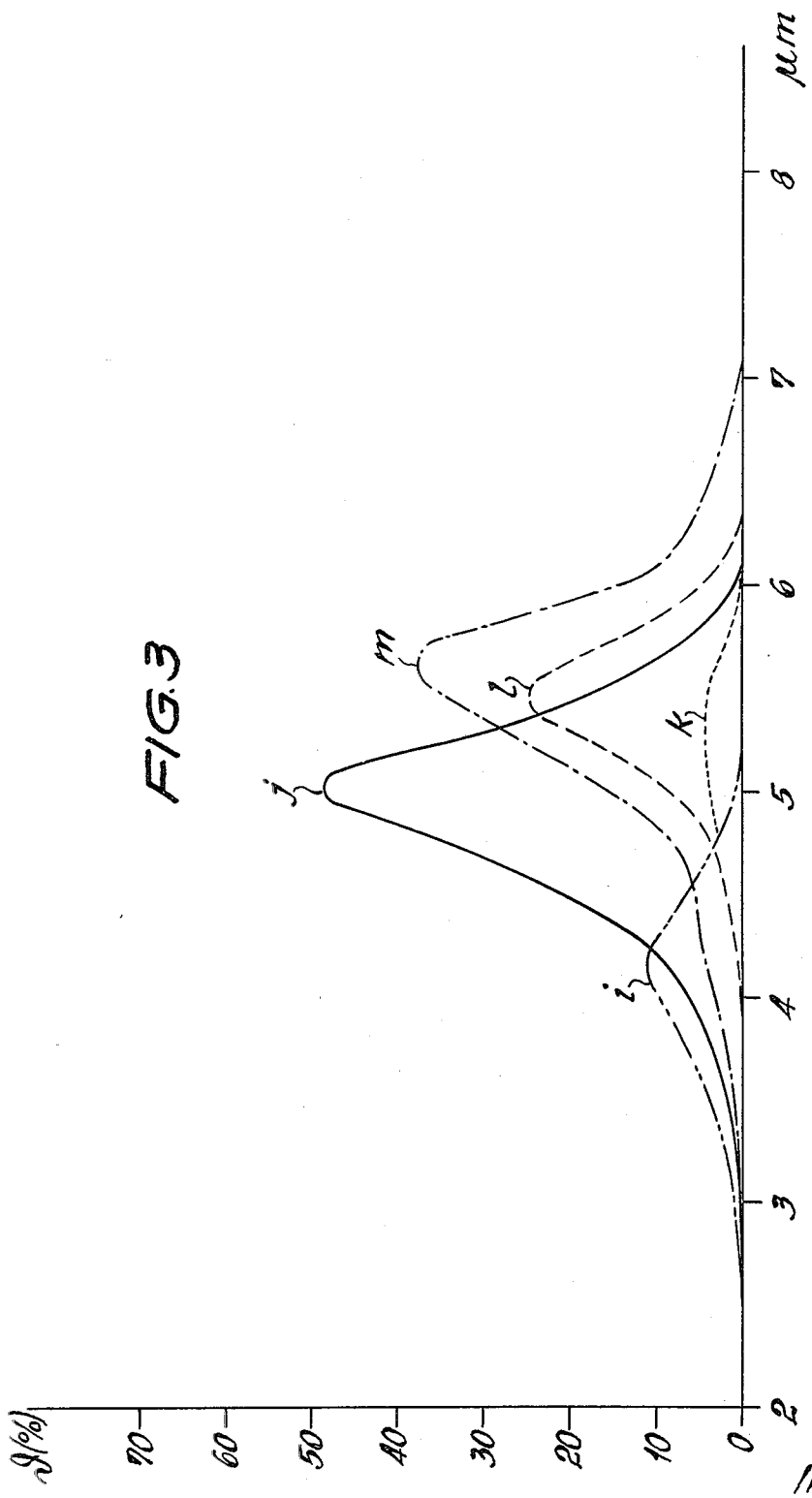

The FIGS. 1, 2 and 3 illustrate the characteristic curves of the various filters.

EXAMPLE 1

98 parts of LiF-powder are mixed with two parts of flint glass (quartz glass) and the mixture is compressed at a temperature of about 500° C, for instance in accordance with the method described in the German Offenlegungschrift No. 1,571,568. The compressed article is then polished. In FIG. 1 the characteristic curve $a$ illustrates the light permeability $\theta$ of the plate produced in this manner in relation to the wave length $\lambda$. The thickness of the specimen plate was 3 mm. The specimen is impermeable, except in the spectral range from approximately 5.5 to 7.7 $\mu$m. The maximum permeability lies at 6.5$\mu$m.

EXAMPLE 2

98 parts of LiF-powder and 2 parts of $NaHCO_3$-powder are mixed and the mixture is compressed at 500°C. The compressed article is then polished. In FIG. 1 the characteristic curve $c$ illustrates the light permeability of a specimen plate having a thickness of 3 mm. The specimen is impermeable, except in the range from 4.5 to 6.0$\mu$m. The maximum permeability is at 5.4$\mu$m.

EXAMPLE 3

97 parts of LiF-powder and 3 parts of borosilicate glass with BaO and $La_2O_3$ content are mixed and the mixture is compressed at 500°C. The compressed body is then polished. In FIG. 1 the characteristic curve $d$ illustrates the light permeability of a specimen plate having a thickness of 1 mm. The specimen is impermeable, except in the range from about 5.4 to 6.6$\mu$m. The maximum permeability lies at 6.25$\mu$m.

EXAMPLE 4

98 parts of a $CaF_2$-powder and 2 parts of borosilicate glass with BaO and $La_2O_3$ content are mixed and this mixture is compressed at 700°C. The specimen is then polished. FIG. 2 illustrates the characteristic curve $e$ of a specimen plate having a thickness of 3 mm. The specimen is permeable within the range from about 3.3 to 6.4$\mu$m. The maximum permeability lies at 5.8$\mu$m.

EXAMPLE 5

90 parts of a $BaF_2$-powder and 3 parts of quartz crystal powder are mixed and the mixture is compressed at a temperature of about 700°C. The specimen is then polished. In FIG. 2 the characteristic curve $f$ illustrates the light permeability of a specimen plate having a thickness of 1.5 mm. The specimen is permeable within a range from approximately 3.2 to 4.9$\mu$m. The maximum permeability lies at 4.1$\mu$m.

EXAMPLE 6

97 parts of a $BaF_2$-powder are mixed with 3 parts of fluorophosphate and the mixture is compressed at a temperature of about 700°C. The specimen is then polished. In FIG. 2 the characteristic curve $g$ illustrates the light permeability of a specimen plate having a thickness of 1 mm. The specimen is permeable within the range from about 7.0 to 8.5$\mu$m. The maximum permeability lies at 7.95$\mu$m.

EXAMPLE 7

97 parts of $BaF_2$-powder and 3 parts of $GeO_2$-powder are mixed and the mixture is compressed at a temperature of 700°C. The specimen is then polished. The light permeability of a specimen plate having a thickness of 1.5 mm is illustrated by the characteristic curve $h$ in FIG. 2. The specimen is permeable within a range from about 9.8 to 11.8μm. The maximum permeability lies at 10.8μm.

EXAMPLE 8

97 parts of a BaF$_2$-powder and 3 parts of BaTiO$_3$-powder are mixed and the mixture is compressed at a temperature of about 700°C. The specimen is then polished. The light permeability of a specimen having a thickness of 1.5 mm is illustrated by the characteristic curve $i$ in FIG. 3. The specimen is permeable within a range from about 3.4 to 4.8μm. The maximum permeability lies at 4.2μm.

EXAMPLE 9

95 parts of KBr-powder and 5 parts of a powder of a borosilicate glass with BaO- and La$_2$O$_3$ content are mixed and compressed. When employing a plane press die it is in most cases not necessary to polish the specimen. in FIG. 3 the characteristic curve $j$ illustrates the light permeability of a specimen plate having a range from about 3.7 to 5.8μm. The maximum permeability lies at 5.0μm.

EXAMPLE 10

95 parts of NaF-powder and 5 parts of a powder of magnesium-aluminium-silicoborate glass are mixed and the mixture is compressed. In FIG. 3 the characteristic curve $m$ illustrates the light permeability of a specimen plate having a thickness of 0.6 mm. The specimen is permeable within the range from 4.0 to 6.7μm. The maximum permeability lies at 5.6μm.

EXAMPLE 11

95 parts of LaF$_3$-powder and 5 parts of a barium-borosilicate glass are mixed and the mixture is compressed. The specimen is permeable within a range from about 7.8 to 11.0μm.

The grain size of the material used for the embedding should be equal to 200μm or smaller. The grain size of the powder to be embedded has to be equal to 40μm or smaller.

The specimens are stable at atmospheric pressure. By varying the thickness of the specimen one is able to vary the permeability in the indicated range. Many additional substances may be used for the production of such filters having permeabilities in other spectral ranges. The examples given in the foregoing are only a small selection. Changing the granulation of the embedded powder influences the spectral permeability of the filter.

What I claim is:

1. An optical filter comprising a compressed solid mass of light ray permeable embedding powder; and dispersed powder, said embedding powder having a refractive index in a short-wave spectral range smaller than that of the dispersed powder, said dispersed powder having a refraction index that changes in relation to the wave length of the light more greatly than the refractive index of the embedding powder so that in a specific wave length range the refractive indices of embedding powder and the dispersed powder are equal, said embedding powder being solid and capable of withstanding operational temperatures of the filter as high as between about 400° to 600°C, in which said embedding powder is selected from the group consisting of LiF, CaF$_2$, LaF$_2$, NaF, and BaF$_2$ and in which said dispersed powder consists of material selected from the group consisting of quartz glass, NHCO$_3$, boro silicate glass, boro silicate glass containing BaO and La$_2$O$_3$, quartz crystal, phosphate fluoride glass, GeO$_2$ powder, baTio$_3$, magnesium-aluminum-silicoborate glass, and barium borosilicate glass.

2. Optical filter according to claim 1, in which said embedding material consists of a mixture of the materials of said group.

3. Optical filter according to claim 1, in which said dispersed powder has a grain size smaller than 60 micrometers.

4. An optical filter in accordance with claim 1 in which the mixture compressed to form the solid mass contains between 98 parts of the embedding powder to 2 parts of the dispersed powder and 95 parts of the embedding powder to 5 parts of the dispersed powder.

* * * * *